Feb. 25, 1941.   P. E. MATTHEWS   2,233,293
INDEPENDENT WHEEL SUSPENSION
Filed Sept. 8, 1937   4 Sheets-Sheet 1

INVENTOR.
Philip E. Matthews,
Hoguet, Neary & Campbell
BY   HIS ATTORNEYS

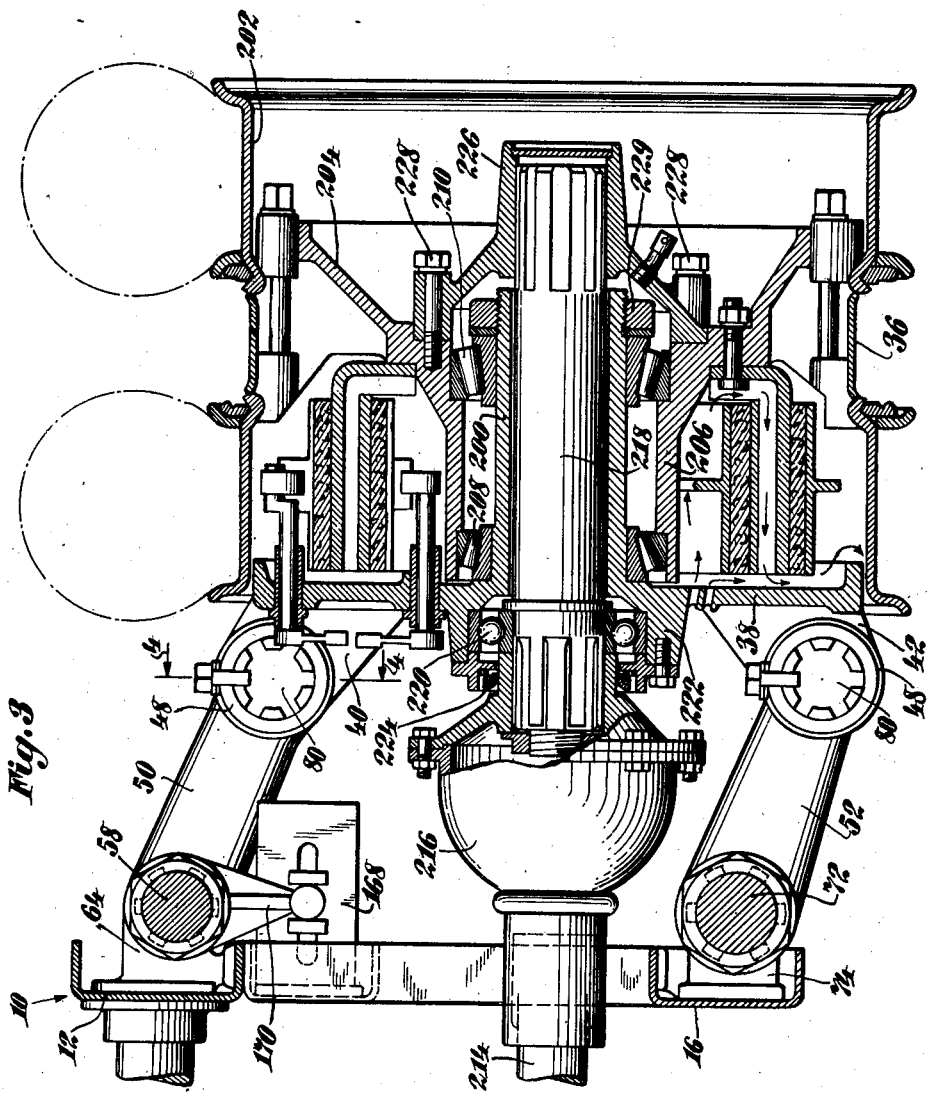
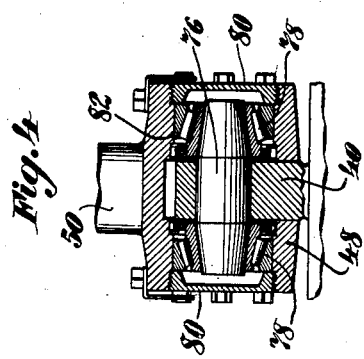

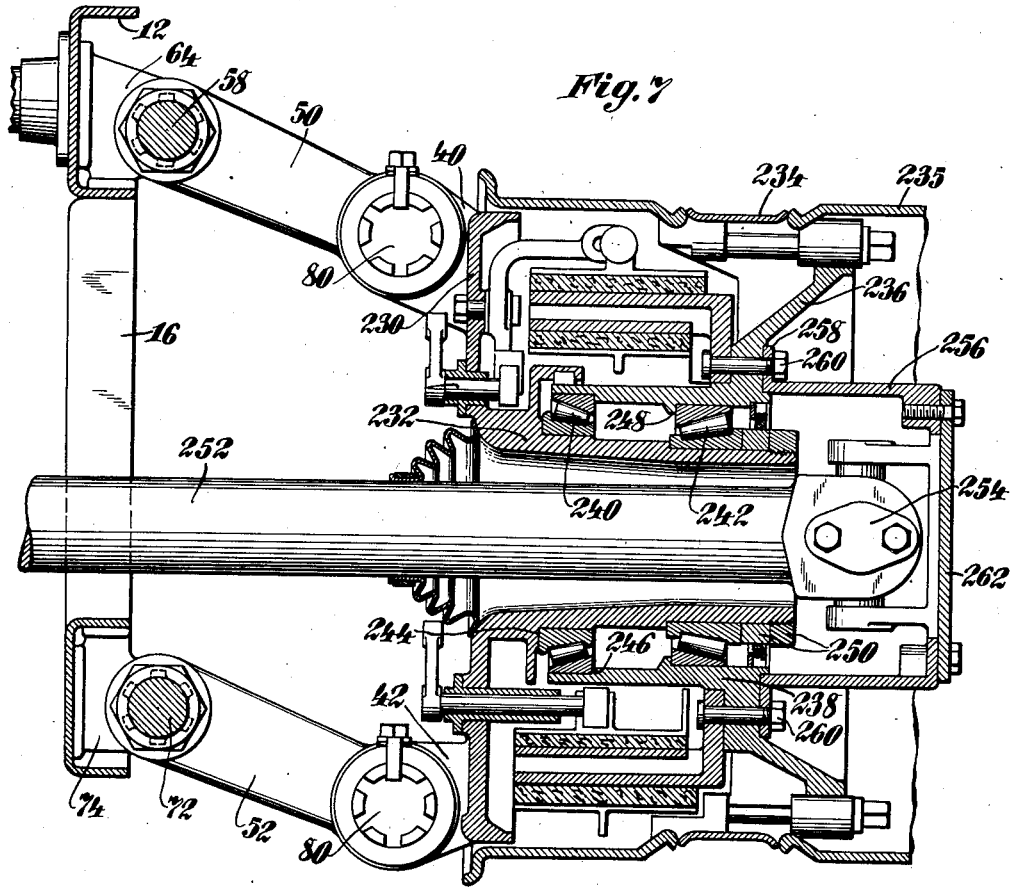
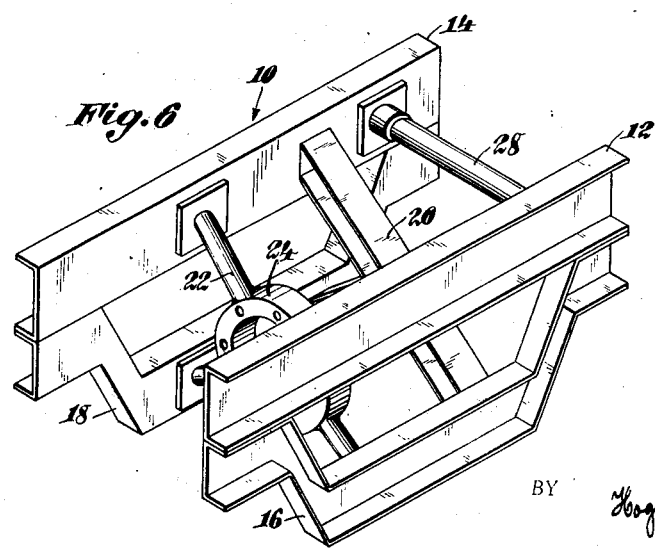

Feb. 25, 1941.  P. E. MATTHEWS  2,233,293
INDEPENDENT WHEEL SUSPENSION
Filed Sept. 8, 1937  4 Sheets-Sheet 4
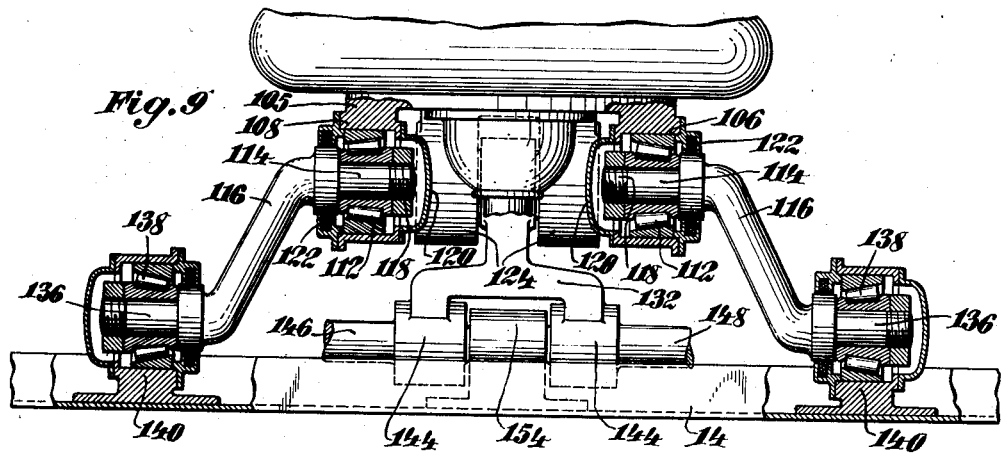
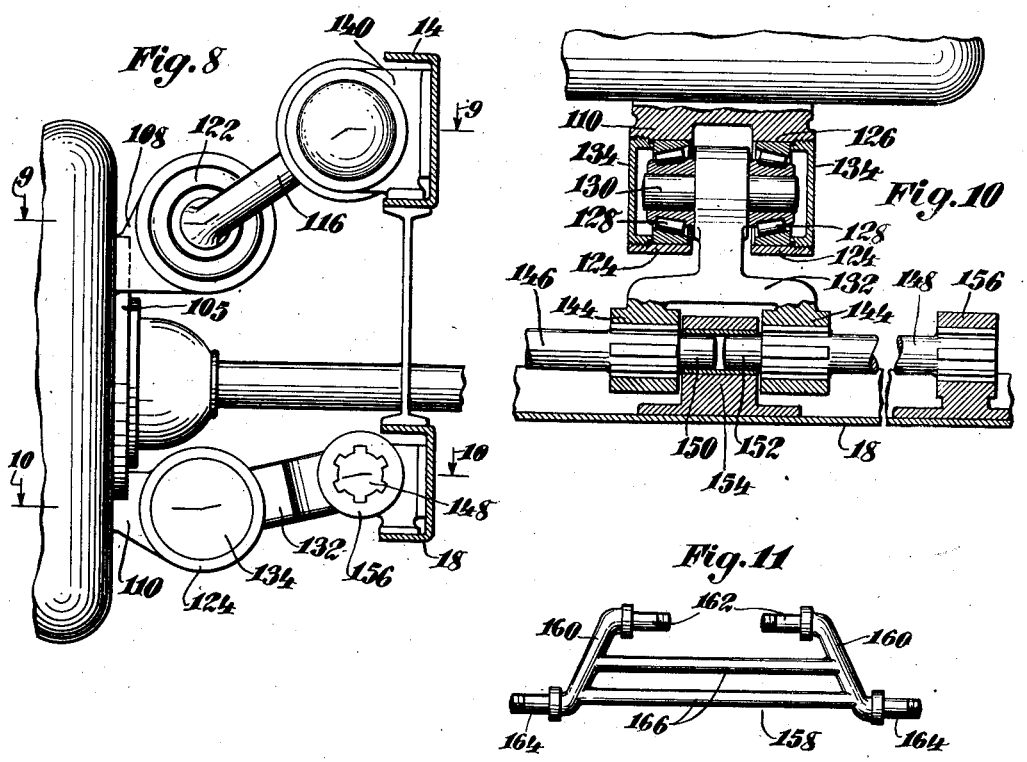
INVENTOR.
Philip E. Matthews,
BY Hoguet, Neary + Campbell,
HIS ATTORNEYS Patented Feb. 25, 1941

2,233,293

UNITED STATES PATENT OFFICE 2,233,293

INDEPENDENT WHEEL SUSPENSION

Philip E. Matthews, Plainfield, N. J., assignor to Mack Manufacturing Corporation, Long Island City, N. Y., a corporation of Delaware Application September 8, 1937, Serial No. 162,947

9 Claims. (Cl. 180—73)

This invention relates to spring suspensions for vehicle wheels and particularly to independent wheel suspensions, wheel mountings and braking mechanisms for vehicles.

Independently sprung wheels utilizing leaf springs as an energy absorbing means have been used heretofore on vehicles of various types. Leaf springs, however, are of such shape and size that it is difficult to fit them into the available spaces in the vehicle chassis. Furthermore, to obtain the desired absorption of energy, it is necessary to form the springs of relatively large size, particularly when used in buses, trucks and other heavy duty vehicles, thus increasing the difficulties encountered in mounting them upon the vehicle chassis.

Independent wheel suspensions have been applied commercially only to the undriven or front wheels of vehicles, because it is difficult to provide suspensions for the wheels sufficiently strong to maintain them in alignment when subjected to driving and braking torques.

Likewise difficulties are encountered in independently suspending driving wheels because the movement of the wheels is restricted by the resistance to movement or inertia of the propeller and axle shafts.

As shown in my co-pending application Ser. No. 757,089, filed December 12, 1934, now Patent No. 2,100,285, independent suspensions for wheels may be rendered more compact and efficient by the use of torsion or coil springs because of their ability to absorb more energy than leaf springs per unit area. It has been found that by using torsion springs, sturdy wheel suspensions may be constructed which are suitable for independently springing the driving wheels of vehicles.

An object of the invention, therefore, is to provide independently sprung mountings for the driving wheels of a vehicle which absorb shock and maintain the proper alignment of the wheels under driving and braking torques.

A further object of the invention is to provide a novel construction for mounting the wheels on the independent suspension in a manner to reduce the unsprung weight of the vehicle and to allow driving torques to be delivered to the wheels without disturbing the operation of the independent suspension.

A further object of the invention is to provide a novel wheel mounting construction by means of which the driving shaft and axles are relieved of all forces except the driving torques.

Additional objects will be apparent from a more detailed description of typical forms of devices embodying the various phases of the invention.

In the forms of the invention illustrated, the driving wheels of a vehicle are rotatably mounted on a housing which is connected through a plurality of arms to the frame of the vehicle to allow vertical movement of the wheels. At least one of the arms is fixed to a torsion spring which resists upward movement of the wheels. The wheels are driven by axles universally connected to a differential in a housing preferably fixed in the vehicle frame, so that the wheels are unaffected in their movement by the inertia of the differential, thus materially reducing the unsprung weight.

This construction is advantageous in that the riding qualities of the vehicle are improved without reducing the ability of the suspension to withstand shock and carry heavy loads and without introducing restrictions to the free movement of the wheels.

For a better understanding of the invention, reference may be had to the accompanying drawings in which:

Figure 3 is an enlarged sectional view taken on line 3—3 of Figure 1;

Figure 4 is a sectional view taken on line 4—4 of Figure 3;

Figure 6 is a perspective view of a portion of the frame of a vehicle;

Figure 7 is a sectional view of a modified form of wheel mounting and a driving axle;

Figure 8 is an end view of a modified form of independent wheel suspension shown partly in section and partly broken away;

Figure 9 is a sectional view taken on line 9—9 of Figure 8;

Figure 10 is a broken, sectional view taken on line 10—10 of Figure 8; and

Figure 11 is a plan view of a modified form of wheel suspending yoke.

Figure 1:
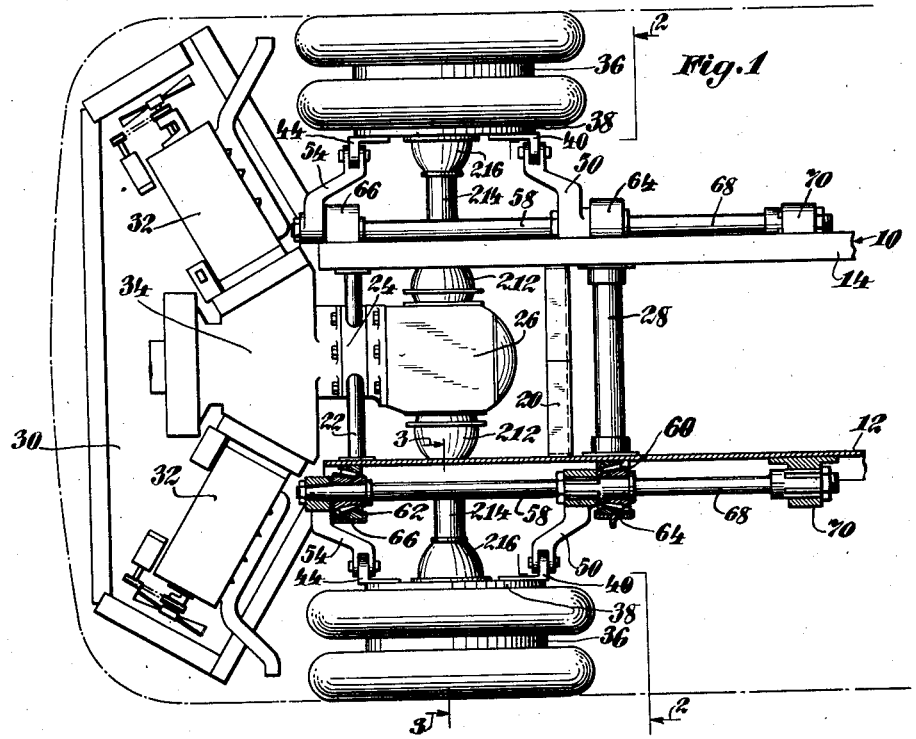
Figure 1 is a plan view of a typical form of wheel suspension embodying the invention.

In the form of the invention illustrated in Figures 1, 3 and 6, the frame 10 of the vehicle consists of outwardly openinng channel members 12 and 14 to which are connected supplemental drop channel members 16 and 18 forming a skeletal box-like construction. The channels 12 and 18 and 14 and 16 may be braced and rigidified by means of an X-member 20 and a similar X-member 22 carrying a banjo-type housing 24 for supporting a differential and differential housing 26. Additional cross members 28 may be disposed between channel members 12 and 14 as desired, in order to rigidify the frame 10.

This construction produces a strong, rigid support for the independent spring suspension and further serves to support the differential housing 26 against movement with the wheel.

The power units, transmission and differential may be a unitary construction mounted rigidly in the chassis as illustrated in Figure 1. In this construction a rearwardly extending platform 30 is fixed to the frame 10 and carries twin motors 32, a clutch and transmission 34 which are connected to the differential in housing 26. Driving energy may be transmitted from opposite sides of the differential to the wheels in a manner later to be described.

Independent wheel suspension

Each wheel 36 is journaled on housing 38 which is independently sprung from the frame 10. In the form of wheel suspension disclosed in Figures 1 to 4, the housing 38 is provided with four lugs 40, 42, 44 and 46 arranged in vertically aligned pairs and projecting toward the frame 10. Each lug is received between identical bifurcated portions 48 on the outer ends of four levers 50, 52, 54 and 56.

Levers 50 and 54 are keyed or splined to a shaft 58 which is journaled in the roller bearings 60 and 62. The roller bearings 60 and 62 are mounted in bearing housings 64 and 66 which are fixed in the channel member 12 of the frame 10. The shaft 58 is extended and forms a torsion spring 68 which has its forward end splined in a coupling 70 which is fixed in the channel member 12. Upward and downward movements of levers 50 and 54 are resisted by the torsion spring 68 which thereby acts as an energy absorbing means.

Levers 52 and 56 are keyed or splined to a shaft 72 journaled at its ends in similar bearings 74 which are mounted in the drop channels 16 and 18. The shaft 72 may or may not, as desired, be provided with a torsion spring extension. The addition of such a torsion spring may be desirable for use in heavy duty vehicles, but as illustrated, is usually unnecessary.

Friction losses and resistance to movement in the suspension may be reduced by inserting roller bearings where necessary. For example, as shown in Figure 4, pivot pins 76, in roller bearings 78, may be used to connect the lugs 40, 42, 44 and 46 to the bifurcated portions 48 of the levers 50, 52, 54 and 56. Suitable end caps 80 may be provided for closing the ends of the bores 82 in the levers and oil sealing gaskets may also be provided for retaining lubricant in the roller bearings 78.

Figure 5:
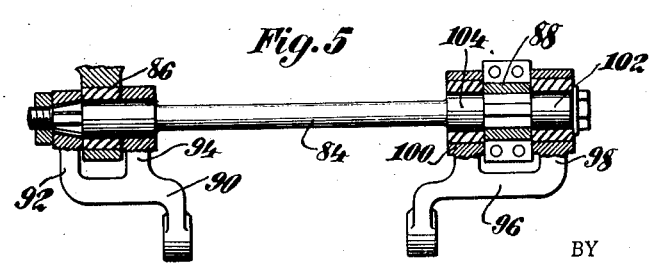
Figure 5 is a plan view of a modified form of torsion spring and mounting therefor partly broken away, utilized for independently springing the wheels.

Another form of independent wheel suspension is disclosed in Figure 5. This construction may consist of torsion spring 84 rotatably mounted in a journal 86 at one end and fixedly connected to a coupling 88 adjacent its other end. A wheel suspension arm 90 is provided with spaced arm portions 92 and 94, the former being fixedly connected to the torsion spring 84 by a tapered spline, while arm portion 94 is rotatably mounted on the torsion spring. A similar wheel suspension arm 96 is also provided with spaced portions 98 and 100 which are rotatably mounted upon cylindrical portions 102 and 104 on the torsion spring 84. With this construction, the overall length of the torsion spring and mounting construction may be reduced. It is therefore readily applicable to a motor vehicle in a comparatively limited space.

The above described construction forms one-half of the independent suspension for one wheel. The other parallelly arranged half is similar in construction, differing in that the torsion spring is reversed so that the arm 90 is freely rotatable while the arm 96 is coupled to the end of the torsion spring. Thus, one of the arms of each vertically aligned pair is normally restrained against movement by a torsion spring. If desired, however, the construction may be made sufficiently rigid that only one such torsion spring as 84 is required. The other arms may be similar to arms 52 and 56 of the first described form of suspension, and being splined to a shaft 72 prevent wobble or rotation of the wheel supporting housing.

Another form of independent wheel suspension is disclosed in Figures 8, 9 and 10. This construction may consist of a wheel supporting housing 105, having journals 106 and 108 projecting toward the channel member 14. The journals 106 and 108 are located at the top of the housing 105, while a third journal 110 is fixed to the bottom of the housing 105, midway between the journals 106 and 108. Each of the journals 106 and 108 is provided with a roller bearing 112, within which is received one end 114 of a crank arm 116. The bearing end 114 may be provided with a threaded portion 118 for receiving a nut for locking the crank arm 116 in the bearing, but allowing rotation of the arm 116 relative to the housing 105. Suitable end caps 120 and oil seals 122 may be provided for retaining lubricant in the roller bearings 112.

Journal 110 may consist of spaced portions 124 having bores 126 therethrough adapted to receive roller bearings 128 through which passes a pivot pin 130 carried by an arm 132. Suitable end closures 134 may be provided for sealing the bores 126 in the spaced portions of the journals 110.

The crank arms 116 and the arm 132 are pivotally connected to the frame 10 by means of suitable roller bearing and torsion spring elements, respectively. The arms 116, which are similar, are provided with reduced ends 136 mounted in roller bearings 138 in journal members 140 which are fixed to channel member 14. The lever arm 132 is provided with spaced sleeve portions 144 which are splined to separate torsion springs 146 and 148, each having a reduced end 150 and 152, respectively, which is journaled in a bearing 154 fixed to the channel member 18. The outer ends of the torsion springs 146 and 148 are splined to couplings 156, which are also fixed to the channel member 18. This construction assures a positive alignment of the wheels during driving and braking, but allows movement of the wheels substantially perpendicular to the frame against the resistance of torsion springs 146 and 148.

If desired, this construction may be modified by using a unitary crank yoke 158 instead of two opposed arms 116. This construction is best illustrated in Figure 11 and may suitably consist of two similar crank members 160 having reduced bearing portions 162 and 164 which are rigidly connected by means of strengthening bars 166. This type of construction may be received in the bearings 106, 108, 140 similar to the manner in which cranks 116 are mounted.

In each of the above described constructions, the torsion springs are of less diameter than the shaft or the shaft at the root of the splines. This construction localizes breakage in the torsion spring and prevents collapse of the suspension by breakage at other points.

It will be understood that each of the above described cnostructions forms the suspension for but a single wheel. The constructions for supporting the wheels on the opposite side of the chassis are similar with the exception that the construction is reversed, or a mirror image of those constructions just described.

It will also be understood that any suitable type of shock absorbers may be applied to the independent suspension. For example, as illustrated in Figure 3, a shock absorber 168 may be mounted on frame 10 and controls oscillation of shaft 58 by engagement with a lever 170 which is splined to shaft 58.

It will be seen that the above described embodiments of the invention provide sturdy, compact constructions for independently suspending the rear or driving wheels of a vehicle from the vehicle frame. The torsion springs and constructions for mounting the suspension arms resist movement of the wheels longitudinally of the frame, thus preventing misalignment and shifting of the wheels under driving and braking torques. The independent wheel suspensions described above allow the main drive shaft and differential to be fixed relative to the frame, relieving the wheels of the inertia of these elements and increasing the freedom of movement of the wheels. Also, the torsion springs are arranged to be disposed in hitherto unused portions of the vehicle frame, thereby allowing ready application of the wheel suspension to vehicles in conjunction with either a front, or a conventional rear wheel drive.

Wheel mountings

Figure 2:
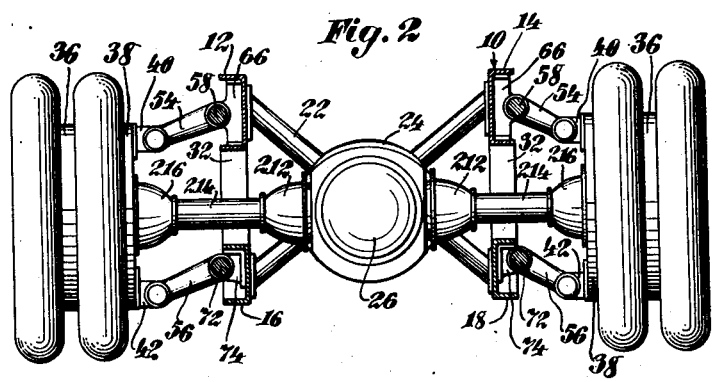
Figure 2 is a sectional view taken on line 2—2 of Figure 1.

As shown in Figures 1, 2 and 3, I have provided a novel wheel mounting and drive construction which allows unrestricted movement of the wheels on the independent suspensions described above. This construction may consist of the housing 38 which is provided with a tubular sleeve 200 upon which a wheel 36 is journaled. The wheel 36 consists of a wide rim member 202 formed in one or more sections which is carried by a disc or spoked member 204 having a bearing sleeve 206 concentric with the rims. The bearing sleeve 206 is journaled on the sleeve 200 by means of roller bearings 208, 210 for free rotation with respect to the housing 38. The driving torque of the motors 32 is transmitted from the differential in housing 26 by means of universal joint 212, drive shaft 214 and an additional universal joint 216 to a stub axle 218 rotatably mounted in the sleeve 200. The universal joint 216 and drive shaft 214 are capable of relative axial movement to compensate for movement of the housing 38 relative to the differential. The stub axle 218 may be mounted in a roller bearing 220, which is supported in a collar 222 extending inwardly from the housing 38 and may be provided with oil sealing gaskets 224 to retain lubricant in the bearings. The outer end of the stub axle 218 is splined to a strong hub 226 which is connected by means of bolts or set screws 228 to the disc member 204, whereby upon rotation of the stub axle 218, the wheel 36 is caused to rotate on the sleeve 200 of housing 38. The wheel 36 is retained on the sleeve 200 by means of a nut 229 threaded on the sleeve and engaging roller bearing 210 to fix the inner race member on the sleeve.

The above described construction provides an extremely flexible coupling between the differential and the wheel whereby movement of the wheel relative to the framework is unrestricted by any resistance to displacement of the axle. The double universal joint connection allows the stub axle to be maintained parallel to the axis of the differential and thereby avoids twisting or bending of the elements during movement of the wheels on the independent suspension. Additionally, none of the braking torques are delivered to the stub axle 218 or the shaft 214 due to the fact that all of these reactions are carried by the independent suspension and the frame.

Another form of wheel mounting is disclosed in Figure 7 and may consist of a housing 230 independently suspended from the vehicle frame in any of the ways above described. The housing 230 includes a tubular sleeve 232 upon which is journaled a wheel 234. The wheel 234 illustrated consists of a rim member 235 or plurality of connected rims adapted to receive a plurality of tires and has an inner disc or spoke member 236 provided with an inwardly directed bearing sleeve 238. The bearing sleeve 238 is rotatably mounted on the housing sleeve 232 by means of interposed roller bearings 240 and 242, whereby the wheel is capable of rotation relative to the housing 230. The wheel 234 may be retained on the sleeve 232 by locking the bearings against displacement with respect to the sleeve 232 by means of shoulders 244 and 246 on the sleeves 232 and 238, respectively, and by a shoulder 248 on sleeve 238 which engages the bearing 242. A lock ring and nut 250 threadedly engages the sleeve 232 to secure the elements in assembled position. The energy of the motor may be transmitted to the wheel 234 by means of an axle 252 which is universally connected to the differential (not shown), and likewise, connected to the wheel 234 through a universal joint 254 mounted on a heavy duty hub 256 which is bolted to the wheel. The hub 256 is provided with a flange 258 which engages the spoke or disc element 236 of the wheel and is retained against movement with respect thereto by means of bolts 260. The hub or housing 256 may be provided with a removable cap plate 262 for facilitating inspection and lubrication of the elements of the wheel.

This construction also provides a very sturdy mounting for a wheel and introduces no restrictions upon the movement of the wheel relative to the differential and the framework.

It will be understood from the foregoing, that I have provided a novel wheel suspension which is satisfactory for use in connection with the driving wheels of vehicles and which may with great facility be applied to vehicles of many different sizes and weights, without necessitating a complete replanning of the chassis to accommodate these parts.

It will be understood further that there can be many variations made in the construction described above without departing from the invention. Therefore, the devices described should be considered as illustrative only and not as limiting the scope of the claims.

I claim:

1. A vehicle frame comprising horizontal side frame members, auxiliary frame members depending from the first members, X-members disposed vertically and transversely of the horizontal frame members for connecting and bracing the frame members, and means for independently mounting wheels for suspension from the frame members on opposite sides of the frame.

2. A vehicle frame comprising side frame members, auxiliary drop frame members depending from the first frame members, an X-member having a substantially centrally disposed banjo-housing connecting and bracing the frame members, means for mounting wheels independently upon opposite sides of the frame, and means including a differential drive for said wheels at least partially supported by said banjo-housing.

3. In a vehicle frame, the combination of side frame members, auxiliary frame members depending from the first frame members, means for mounting wheels independently on opposite sides of the frame, an X-member having a substantially centrally disposed banjo-housing connecting and bracing the frame members, and a unitary engine, transmission and differential supported on said frame and said housing for driving said wheels.

4. In a wheel suspension for vehicles, the combination of a vehicle frame, comprising upper frame members and auxiliary frame members depending therefrom, a housing, a wheel rotatably mounted on said housing, a pair of arms pivotally connected at spaced points to an upper frame member and the housing, an elongated torsion spring mounted on the lower member with one end fixed and the other end rotatably connected thereto, and a third arm fixed to the rotatable end of the torsion spring and pivotally connected to the housing resisting displacement of the housing relative to the frame.

5. In an independent suspension for vehicle wheels; the combination of a vehicle frame, said frame being provided with a pair of spaced bearings mounted in spaced relation along the side thereof, a torsion shaft extended through said bearings and fixed to said frame at a point spaced from said bearings, means for rotatably supporting a wheel, means including a pair of arms for operatively connecting said wheel supporting means to said shaft at points immediately adjacent said bearings, and at least one of said arms being fixed to said shaft.

6. In an independent suspension for vehicle wheels; the combination of a vehicle frame, said frame being provided with a pair of bearings mounted in spaced relation along the side thereof, a torsion shaft extended through said bearings with an end thereof fixed to said frame, means for rotatably supporting a wheel, means including a pair of arms for operatively connecting said wheel supporting means to said shaft at points immediately adjacent said bearings, said arms being pivotally connected at spaced points to said wheel supporting means, and at least one of said arms being fixed to said shaft at a point spaced from the end of the shaft fixed to said frame.

7. In an independent suspension for vehicle wheels; the combination of a vehicle frame including a channel member along a side thereof, said member being provided with a pair of bearings mounted in spaced relation on the channel side of said member and at least partially housed thereby, a torsion shaft extended through said bearings and substantially parallel to said member with an end thereof fixed to said member, means for rotatably supporting a wheel, means including a pair of arms for operatively connecting said wheel supporting means to said shaft at points adjacent said bearings, and at least one of said arms being fixed to said shaft.

8. In an independent suspension for vehicle wheels; the combination of a vehicle frame having upper and lower side members, the upper and lower members of a side of said frame each being provided with a torsion shaft substantially parallel and closely adjacent thereto and spaced bearings for rotatably supporting the shaft, means for holding one end of each shaft against rotation, means for rotatably supporting a wheel, and means including a plurality of arms for operatively connecting said wheel supporting means to the torsion shafts at points immediately adjacent the bearings thereof.

9. In an independent suspension for vehicle wheels; the combination of a vehicle frame. said frame being provided with a pair of spaced bearings of the thrust type and arranged in opposing relation to each other, a torsion shaft extended through said bearings and fixed to said frame at a point spaced from said bearings, means for rotatably supporting a wheel, means including a pair of arms for operatively connecting said wheel supporting means to said shaft at points adjacent said bearings, and at least one of said arms being fixed to said shaft.

PHILIP E. MATTHEWS.